US010248782B2

(12) United States Patent
Hussain et al.

(10) Patent No.: US 10,248,782 B2
(45) Date of Patent: Apr. 2, 2019

(54) SYSTEMS AND METHODS FOR ACCESS CONTROL TO WEB APPLICATIONS AND IDENTIFICATION OF WEB BROWSERS

(71) Applicant: Duo Security, Inc., Ann Arbor, MI (US)

(72) Inventors: Mujtaba Hussain, Ann Arbor, MI (US); Jon Oberheide, Ann Arbor, MI (US); Jonathan Hurshman, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 15/882,088

(22) Filed: Jan. 29, 2018

(65) Prior Publication Data

US 2018/0218145 A1 Aug. 2, 2018

Related U.S. Application Data

(60) Provisional application No. 62/451,194, filed on Jan. 27, 2017.

(51) Int. Cl.
*G06F 21/44* (2013.01)
*G06F 11/36* (2006.01)
*H04L 29/06* (2006.01)
*H04L 29/08* (2006.01)

(52) U.S. Cl.
CPC .......... *G06F 21/44* (2013.01); *G06F 11/3668* (2013.01); *H04L 63/0876* (2013.01); *H04L 63/10* (2013.01); *H04L 63/1433* (2013.01); *H04L 67/02* (2013.01)

(58) Field of Classification Search
CPC ............................. H04L 63/0876; G06F 21/44
See application file for complete search history.

(56) References Cited

U.S. PATENT DOCUMENTS

| | | | |
|---|---|---|---|
| 8,528,061 B1* | 9/2013 | Davis | H04L 63/123 726/1 |
| 2014/0026220 A1* | 1/2014 | Gehrig, Jr. | H04L 67/38 726/23 |
| 2015/0178516 A1* | 6/2015 | Mityagin | G06F 21/6218 707/783 |
| 2017/0180373 A1* | 6/2017 | Shao | G06F 21/36 |

* cited by examiner

*Primary Examiner* — David J Pearson
(74) *Attorney, Agent, or Firm* — Jeffrey Schox; Padowithz Alce

(57) ABSTRACT

A method and system includes: receiving an access request for a protected web application server by the requesting browser application; returning a web page embedded with code that initiates a browser testing session between the requesting web browser and a remote access control server; generating a browser identity inspector based on a selection of two or more predetermined browser identity tests; executing the browser identity inspector to collect runtime environment data of the requesting web browser based on an execution of the selected two or more predetermined browser identity tests at the requesting web browser; compiling the collected runtime environment data into a browser digital fingerprint of the requesting web browser; using the browser digital fingerprint to: identify a browser version and type of the requesting web browser; calculating a browser identity confidence score that indicates a likelihood or a probability that the identified browser version and type is accurate.

20 Claims, 3 Drawing Sheets

SYSTEMS AND METHODS FOR ACCESS CONTROL TO WEB APPLICATIONS AND IDENTIFICATION OF WEB BROWSERS

CROSS-REFERENCE TO RELATED APPLICATIONS

This application claims the benefit of U.S. Provisional Application No. 62/451,194 filed 27 Jan. 2017, which is incorporated in its entirety by this reference.

TECHNICAL FIELD

This invention relates generally to the computer security field, and more specifically to a new and useful method for identifying and controlling access to web-accessible software applications.

BACKGROUND

Computer and network security vulnerabilities may exist in many forms. In this regard, protective strategies are continually developed to address the many computer and network security concerns. Vulnerabilities in software applications, namely web software applications, such as web browsers, plugins, extensions, and the like may provide attack opportunities for malicious actors. Specifically, web software applications being run on computers and computer networks must persistently be updated with patches (e.g., security fixes) and the like to close security loop holes and mitigate obvious opportunities for malicious attacks. However, even when patches are made available by a provider of the web software application to address vulnerabilities within web software applications, the users of the web software applications may not be aware of the patches or updates or otherwise, are failing to install the patches in a timely manner.

Organizations generally desire to protect their computers and networks by ensuring that their users are running up-to-date versions of web software applications. Additionally, these organizations typically seek to define policy to restrict access to corporate computers and/or corporate networks unless the web software applications are proven to be up-to-date with the latest versions of patches, application types, and the like to reduce the risk of exploitation of unfixed deficiencies in the applications.

Normally, software applications, such as web browsers would identify themselves to web application servers by sending a string called user-agent which specifies the type and the version number of the web application. Providing web browsers with legitimate type and version numbers would greatly simplify an organization's ability to identify whether the version of a web browser may be current and up-to-date. However, a web browser's user-agent may be malleable and subject to change, as most web browsers have built-in functionality to emulate other web browsers.

Additionally, there exists a tension between the needs of security and privacy and application identifiers, such as a version number, may be useful for security reasons, but also can be exploited by malicious actors if not maintained as private information. Thus, while version numbers may be used for good in security platforms that inform users and organizations on different methods for keeping software applications up-to-date, the version number of a software application may also be abused by malicious parties on the Internet for tracking users/devices (e.g., advertising), targeting the software with specific exploits, or simply changing the version number of a software application to fool policy systems of an organization into trusting that the software application is up-to-date. As a result, many providers of software applications obscure or otherwise, remove version numbers from web-accessible locations.

Thus, there is a need in the computer security field for new and useful methods for identifying software applications beyond the web-accessible version string to mitigate or eliminate potential vulnerabilities in computers and computer networks.

DESCRIPTION OF THE PREFERRED EMBODIMENTS

Figure 1:
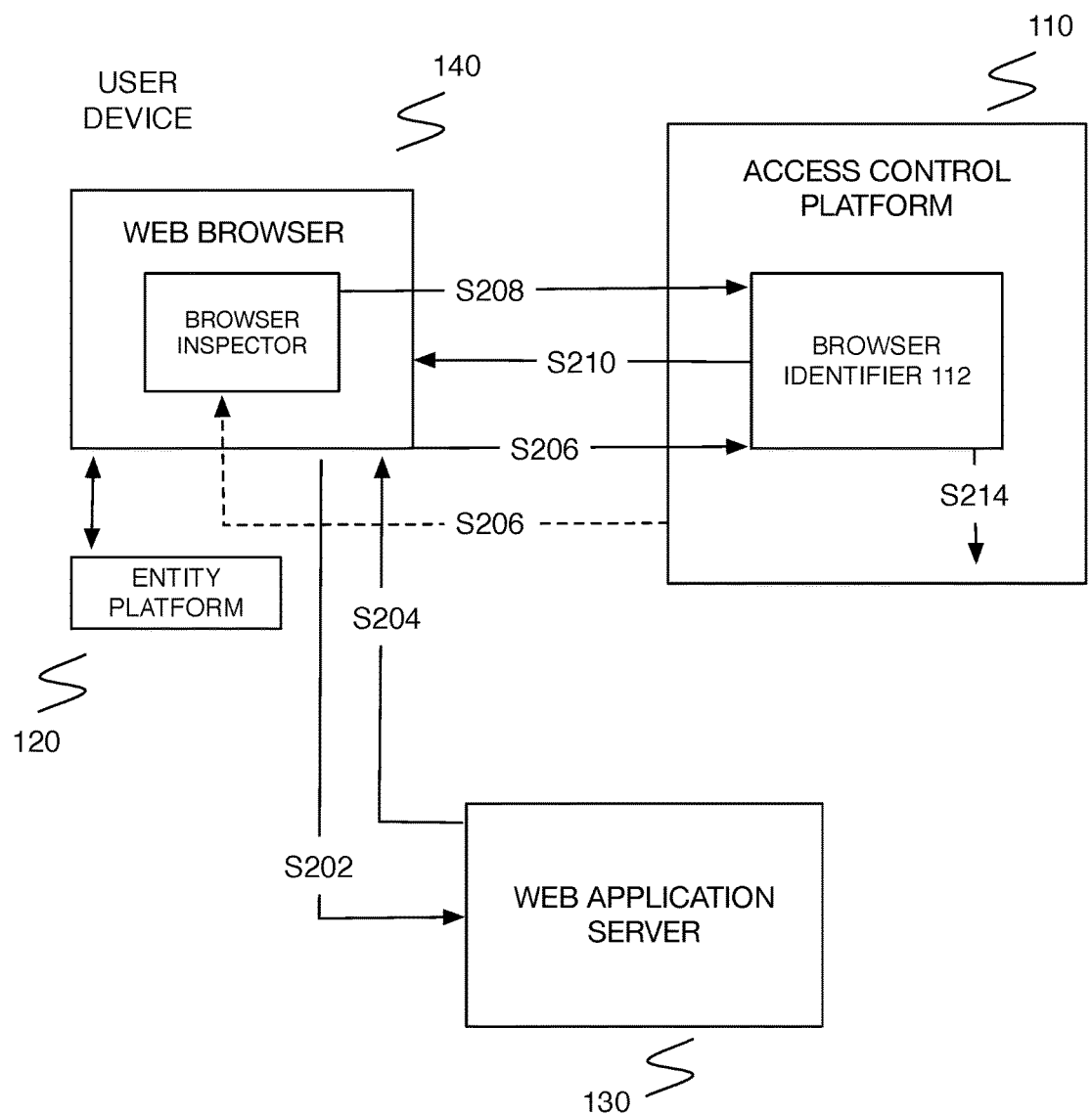
FIG. 1 illustrates a schematic representation of a combination of a system and method in accordance with some embodiments of the present application.

The following description of the embodiments of the present application are not intended to limit the invention to the disclosed embodiments, but rather to enable any person skilled in the art to make and use the inventions described herein.

Overview

To address the above-noted issues in software application identification and the like, one should approach identification of software applications in one or more different ways rather than relying solely on the web-accessible version strings (e.g., browser user-agent or navigator.plugins, etc.), which may be obscured, modified, or otherwise, removed from an application altogether. The following methods, either singly or in combination, are suggested herein as means for discovering an identity or version of software applications, such as a web-browser, plugins, extensions, and the like.

A first method (e.g., test 1 includes providing computer-executable code or script (e.g., JavaScript, HTML, CSS, and the like) and/or an identity algorithm that runs in the target software application, such as a web browser, and inspects the runtime environment of the browser to detect the browser type and version. Specifically, the identity code or identity algorithm may inspect various variables and attributes of the runtime environment of the browser (i.e., the target software application) to detect the browser identity including by [a] identifying JavaScript libraries and objects available to the browser, [b] identifying specific anomalous behaviors or anomalous patterns (e.g., outliers) present in the subject version of the browser or the like that can be detected, [c] identifying Document Object Model (DOM) implementation peculiarities specific to a browser, and [d] analyzing various other browser attributes that are accessible to JavaScript and that can be used to uniquely identify a type and version of the browser. While the identity code or identity algorithm used to assess a runtime environment of a target software application, the composition of the identity code or identity algorithm may include any combination or all tests derived from elements [a]-[b], described above. Additionally, it shall be understood that the composition of an identity code or identity algorithm may include assessment elements or test elements beyond [a]-[b] including those assessment elements expressly or implicitly described throughout the description and figures of the present application.

A second method (e.g., test 2) includes analyzing the hypertext transfer protocol (HTTP) headers of an application that may be sent by the application server. Generally, the HTTP headers can include various information lines about the application, such as a content-type, an Etag, a last-modified header line. Accordingly, the second method may function to generate an assessment that functions to inspect lines of information of an HTTP header of a subject application. Inspecting each of these lines in the HTTP header of an application may be useful to provide an express indication of the application identity or version. The HTTP header may also be useful to identify when the application was last modified. The last date of modification may provide a meaningful insight as to whether the application has been updated with a recent fix or patch. For example, if the last modified date of an application is earlier than a fix or patch date issued by a provider or issuer of the application, then the likelihood that the application may not be the latest version may be high.

In combination with the first method and/or second method, a third method may involve analyzing the user-agent string when provided by a web browser application or similar application. As noted previously, the user-agent string may not always be readily available and if available, there may be some probability that the user-agent string has been modified for various reasons, including legitimate and/or malicious reasons (e.g., hacking). Thus, it may be preferable to analyze the user-agent string in combination with one or both of the first method or second method to identify any consistencies or inconsistencies between the user-agent string and internal attributes of the web browser and/or the web browser's HTTP header data.

It shall be noted that while many of the examples and/or embodiments disclosed herein generally discuss identifying an identity or a version of a browser, the applications of the novel embodiments of the present application should not be limited to only browsers. For instance, these novel techniques and systems may be equally applicable to the inspection and control of any software application and in particular, to software applications or computing servers requesting access or control to one or more applications protected by the one or more systems or services implementing the methods and systems described herein.

Web-Accessible Software Application Identification and Access Control System and Method As shown in FIG. 1, a combination system 100 and process flow of a method 200 for identifying software applications and controlling access to the software application servers by users of an entity's platform is illustrated. The system 100 includes an access control platform 110, a user platform 120, an application server 130, and a user device 140. The system and process flow function to employ a combination of identification and control schemes to discover a type and/or version number of a software application (e.g., a browser, plugins, extensions, and the like) attempting to access an application (e.g., a web application or web application server, etc.) protected by the access control platform no and resultantly, control access to the protected application based on the version number and identity information associated with the software application requesting access and/or control of the protected application.

The access control platform 110 may preferably be remotely located from and operate independently of the entity platform 120, application server 130, and user device 140. In a preferred embodiment, the access control platform no may be operated within a third-party service that functions to assess an access request to a web-accessible software application preferably provided by the application server 130. Additionally, the access control platform no may function to analyze requests and/or responses to the requests by a user for a web services, digital resources or services associated with the entity platform 120, or other web-accessible software applications. The access control platform no may also be a cloud-based platform being implemented via a distributed computing network comprising a plurality of private and/or web servers. Alternatively, one or more parts or the entire access control platform 110 may be implemented and maintained by the entity (e.g., business organization) and at the entity platform 120 rather than via an external party or external web security entity.

The access control platform 110 generally functions to protect a computer and/or a computer network from vulnerable (e.g., out-of-date) web browsers, web-accessible software applications, and the like. Preferably, the access control platform 110 operates to analyze identity attributes of a web browser or other software application before the web browser or other software application obtains access or control to one or more digital resources of service provider (e.g., entity platform 120) and becomes active or functional on a computer or computer network making the request for the browser or application. Accordingly, the access control platform 110 may function to broker a level of access to the requesting web browser or the like to the one or more resources of a service provider based on browser identifying data collected from the requesting browser. In this regard, the access control platform 110 may be configured to receive a request to access a web-accessible application or other application from a web browser of a user, usually initiated by a user associated with a network protected by the access control platform 110, and perform an identity and vulnerability analysis of the web browser.

Accordingly, in some embodiments, a web application server or other application server may be triggered to redirect or reroute a request for a web application or other applications to the access control platform 110. In a preferred embodiment, an access request from a web browser to the web application server may function to trigger the web application server to generate a web page that is embedded with access control code. The embedded access control code, when executed at the requesting web browser, may function to generate one or more request to the access control platform 110. The one or more request to the access control platform no may include a request to establish a secure communication channel between the access control platform no and the requesting web browser. In some embodiments, the secure communication channel between the access control platform 110 and the requesting browser may be ephemeral and intended to last only a short, predetermined amount of time or only for the duration of a browser identification session. The communication channel may be cryptographically secured using an asymmetric or symmetric cryptographic keys. In such embodiments, the web browser may present a symmetric cryptographic key or a public cryptographic key that the access control platform 110 may function to verify prior to establishing the browser testing session. In either case, the access control platform no may function to confirm the browser testing session with the requesting browser by matching a presented symmetric cryptographic key or by pairing the public cryptographic key with the private cryptographic key stored by the access control platform no. Another request may include a request to initiate a browser identification session in which browser identifying tests and resulting browser identifier data is exchanged during the browser identification session.

Accordingly, the returned web page with the embedded access control code may include instructions to re-route the access request for the web application to the access control platform 110. Additionally, or alternatively, the access control platform 110 may be configured to intercept requests for a web-accessible application from an unidentified web browser and process the intercepted request. In such embodiment, once the access control platform no completes an analysis of the requesting web browser, the access control platform no may positively provide or transmit the request for web application to the web application server, cancel the original request, and/or not provide the request for the web application as a result of the access control platform's no analysis of the web browser.

Preferably, a web page or application page returned in response to a request made through a web browser includes embedded code for access control enabling the web browser to broker access to the request web application or software application via interaction with the access control platform no. Thus, the embedded code for access control may function to trigger an initialization by the access control platform no of one or more browser or application identity and/or vulnerability protocols against the requesting browser or application.

Preferably, the access control platform no includes a browser identifier component 112. The browser identifier component 112 functions to generate unique browser inspectors for inspecting requesting web browsers (or application) and identifying web browser types and versions with an identification unit 115. In some embodiments, the browser identifier component 112 may be a module implemented by one or more computer processors of the access control platform no.

Figure 2:
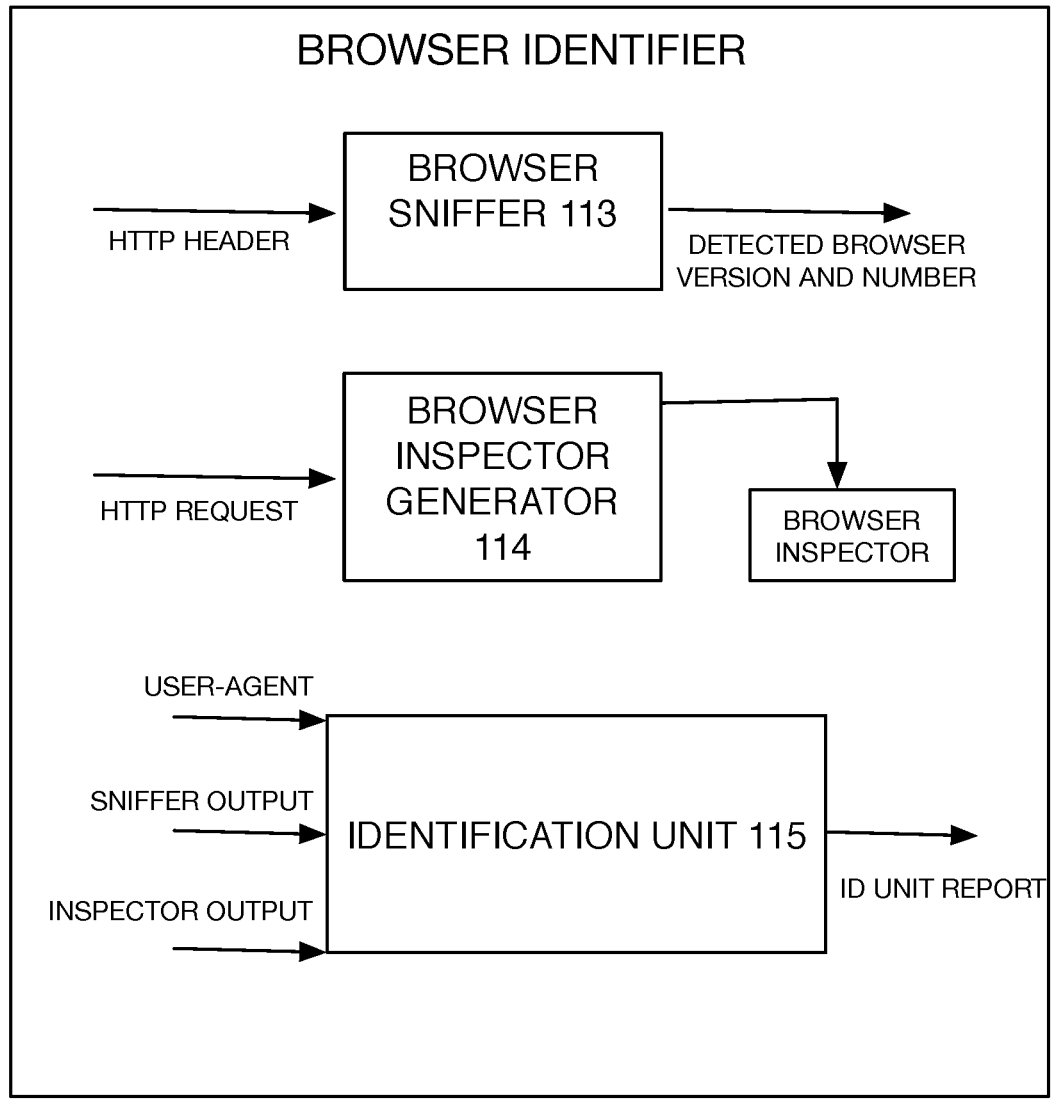
FIG. 2 illustrates a schematic representation of an application identifier component of the system of FIG. 1 in accordance with some embodiments of the present application.

As shown in FIG. 2, the browser identifier 112 includes a browser sniffer 113, a browser inspector generator 114, and an identification unit 115. The browser sniffer 113, independently, functions to detect a browser type and version type of the requesting browser based on browser identifier data collected by a browser inspector from the requesting browser. Specifically, the browser sniffer 113 may function to take as input the HTTP headers of a requesting web browser and may be able to make a determination of a browser type and version type based on the input. The detected browser type and detected version of the requesting browser may be subsequently fed as input into the identification unit 115 for further processing.

The browser inspector generator 114 functions to receive HTTP request data and generate a unique browser inspector 116 based at least on HTTP request data. It shall be noted that the browser inspector generator 114 may function to generate a unique browser inspector based on any suitable browser data including a browser type and/or browser version asserted or claimed by the requesting browser.

It shall be noted that in a preferred embodiment, the browser sniffer 113 and the browser inspector may be individually generated by the browser inspector generator 114 at the access control platform 110. That is, in such preferred embodiment, the browser sniffer 113 and the browser inspector are generated at the one or more computing servers of the access control platform 110. However, while the browser sniffer 113 may function to operate or be executed independently at the access control platform 110 (e.g., via the one or more computing servers), the browser inspector in such embodiments may function to operate or be executed at the client browser that make the request to access an application server. A combination of browser identification data both from the code (e.g., browser inspector) that profiles a runtime environment of the client browser and requested data (e.g., HTTP headers) sent by the browser and analyzed by the access control server via the browser sniffer 113 provides a higher level of confidence in browser identification as opposed to relying on all data coming from the client code (e.g., browser inspector) funning within the browser.

Accordingly, the separation of the execution points of the browser sniffer 113 and the browser inspector provides additional protection where a malicious actor would have to compromise the identification code that is executed within the client browser for browser identification and the browser binary itself that generates HTTP headers that cannot be set by JavaScript funning on the client.

Figure 3:
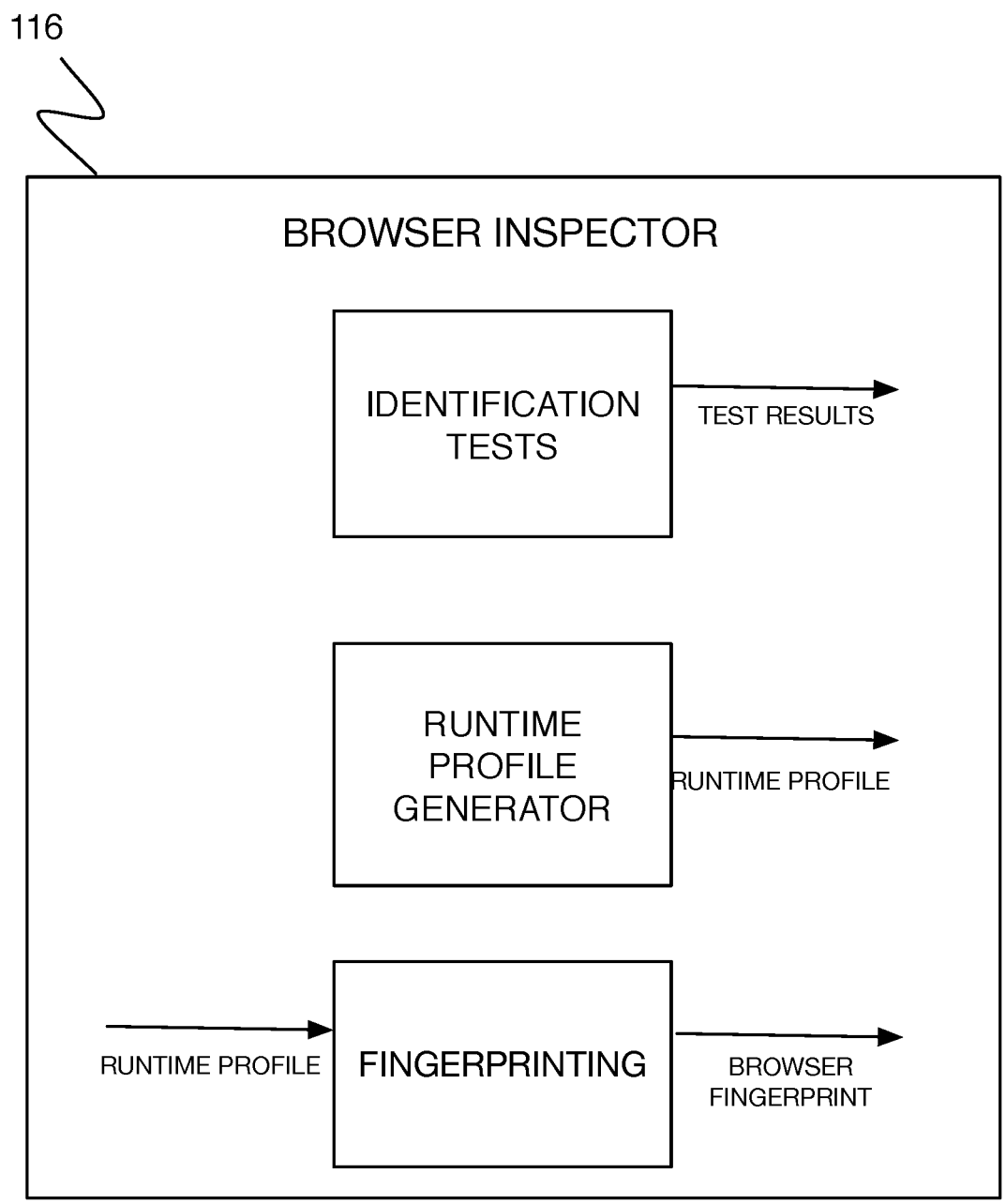
FIG. 3 illustrates a schematic representation of browser inspector of the system of FIG. 1 in accordance with some embodiments of the present application.

As shown in FIG. 3, the uniquely generated browser inspector 116 generally includes one or more inspection tools including a combination of selected browser identifying tests (e.g., test 1 and test 2, and the like) to be applied to a requesting browser. The browser identifying tests may be selected from a browser or application identification test bank that includes a plurality of predetermined browser and application identification assessments and tests. The browser or application identification test bank may continually evolve to include new browser or application tests and/or modifications or updates to tests existing in the test bank. The browser inspector 116 may be configured to perform or execute the tests and inspection against the requesting browser and generate results of the tests and inspections, preferably during a runtime of the requesting browser. Parts or subsets of the results of the browser or application identification tests and vulnerability inspection performed by the browser inspector 116 may be converted (or compiled) into a browser digital fingerprint (or digital profile) and subsequently fed into the identification unit 115 to identify a version number and type of the requesting browser. The browser fingerprint preferably includes data collected during an inspection of a requesting browser or application (e.g., browser) that may be used to uniquely identify the requesting browser or application. In a preferred embodiment, the browser fingerprint includes a digital profile of the application that is constructed by the browser inspector 116 and transmitted to the access control platform 110 as a result of the one or more inspections and/or tests applied to the requesting browser or application.

The identification unit 115 generally functions to receive the results from both the browser sniffer 113 and the browser inspector 116 to provide a claimed browser type and claimed version of the browser, a detected type and detected version of the browser, and a browser or application identify confidence score. The claimed type and the claimed version of the browser may generally be determined based on the assertions and browser or application identifier data supplied by the requesting browser or application and typically, independent form the results of the browser sniffer 113. In the identification unit 115, the detected type and version of the browser determined by the browser sniffer 113 and the claimed type and version of the browser may be compared for inconsistencies and confidence score generation. The greater the disparity between the claimed and detected version and type of browser, the lower the resulting confidence score. The confidence score may be generated in any suitable manner, including as described herein below. These different methods may be combined to provide a more enhanced confidence score for accurately identifying browsers or other applications attempting to access protected networks, protected web application servers, and/or other digital resources of a service provider.

Accordingly, the access control platform 110 can use the output of the identification unit 115 to generate a browser report that may be used in determining whether to allow or deny access to the requestor of the target/requested browser. The browser report may additionally be transmitted to administrator of the entity platform 120 for review and/or policy updates by the entity. Additionally, or alternatively, the output of the identification unit 115 may be used to generate one or more alerts to an administrator of the entity platform 120 or of the application server. Additionally, or alternatively, the output of the identification unit 115 may be used to provide remediation instructions to a user of the requesting browser in the case that the requesting browser has an unsatisfactory browser identification confidence score or the like.

The entity platform 120 may include a computer network, a plurality of user computing devices, and one or more entity servers. The one or more entity servers may include a policy server that may be in operable communication with the access control platform 110. The access control platform 110 may generally check its resulting analysis of one or more web applications/pages against the policies within the policy server of the entity to determine whether the analyzed web applications/pages can be allowed onto the entity's computer network or otherwise, accessible to one or more computing devices operating on the computer network. In some embodiments, the access control platform 110 may include a global policy server that functions to store a plurality of access control policies for a plurality of disparate entities for which the access control platform 110 operates to protect and control access to applications and/or application servers thereof.

The application server 130 may be preferably a web application server that may be external to the entity platform 120 and the access control platform 110. The application server 130 may be generally configured to process requests for a web application and/or application and provide access or control to the web application and/or software application to the requestor.

Still referring to FIG. 1, the process flow of the method 200 includes initiating a request for a web application by a web browser S202, processing the request at a web application server and returning a web page with embedded code S204, generating a browser inspector S206, profiling a runtime environment of the web browser and returning results S208, identifying a version and/or type of the web browser 210, reporting and generating a confidence score of identity 212, allowing or denying access to the web application (software application or service) S214.

At step S202, a user operating a computing device or a user associated with a client device may attempt to access a web application using a web browser or the like. The web application may be preferably monitored and/or protected by the access control platform 110. In some embodiments, the access control platform no may function to monitor activities of or requests to a web application server that provides the web application as a service, as well as other web applications accessible services of an entity to a user. The access control platform 110 may provide protective computer-executable coding to the web application server such that a copy of the protective code may be replicated and embedded in a web page responsive to a request by a web browser to access the web application server or a service thereof. Preferably, the protective coding includes an access control protocol that can be used to trigger the one or more protective schemes of the access control platform no. Accordingly, when the user initiates a request for an application or service via the protected web application server, responsive to the user's request, the web application server may function to return a web page embedded with the protective coding to the requesting web browser. Additionally, or alternatively, the activities of the web application server may be monitored and logged by the access control platform 110 and when a request for an application from a web browser or the like is detected by the access control platform no, the access control platform no may be triggered to initialize one or more protective protocols.

It shall be noted that the user's request for an application or service does not have to be an intentional request, but in some circumstances, the user may inadvertently select an interface feature or button that requests an application or service for an unsolicited advertisement or possibly, another feature that contains malicious coding.

Additionally, the access control platform no generally protects against any type of requests made via an entity's system or an entity application. For instance, while a user may generally initiate a request for a web application or service of a service provider, it may also be possible for an application at the entity (service provider) side to self-initiate a request for access to another application or service. In such instances, the access control platform 110 may function to protect the requested application or service from the requesting application by assessing the identity of the requesting application and identifying a level of access to the requested application based on results of the assessment.

Similarly, the access control platform 110 may be configured to protect against application servers and the like against pushes (e.g., not requested) to the application servers. The access control platform 110 can actively intercept the pushes before the pushes arrive to the application server. Additionally, or alternatively, any pushed data may be automatically redirected by the application server (without accessing the push data or content) to the access control platform. The access control platform 110 can then analyze the pushed data and/or the application or browser that initiated the push according to one or more aspects of the method 200.

At step S204, in response to the request to access a web application server from a requesting web browser, the web application server may function to return web page having embedded code for access control. As previously-mentioned, the embedded code for access control includes a set of instructions that, when executed by the requesting web browser, initiates one or more protective protocols and browser identification schemes, preferably, implemented in conjunction with the access control platform no. Additionally, or alternatively, the access control code may simply cause a redirection of the request to access the web application server to the access control platform 110.

At step S206, the access control code embedded with the returned web page may generally request that the access control platform 110 generate a browser inspector. When executed the access control code may cause the requesting web browser to initiate or establish a communication channel with the access control platform 110 and further, cause the requesting web browser to supply browser identifying data including a browser type and browser version. Additionally, or alternatively, the generation of the browser inspector 116 at the access control platform 110 may be automatic based on a receipt of the browser identifying data from the requesting web browser.

In a preferred embodiment, the browser inspector 116 generally includes computer-executable code corresponding to a plurality or one or more randomly selected tests to be run in the web browser. Additionally, or alternatively, the composition of the browser inspector 116 may include a plurality of browser identification tests selected on a basis of the browser identifier data (e.g., claimed or asserted browser version and/or browser type) supplied by the requesting web browser. The composition of the generated browser may typically be unique to the requesting web browser since the browser inspector 116 may be made up of randomly or intentionally selected tests and the tests may be selected from a pool of tests specifically designed for identifying probative attributes of known web browsers for the purposes of generating an assessment of an identity of a web browser to the exclusion of the browser identifier data supplied by a requesting web browser.

A technical advantage achieved by randomly selecting the tests to be included in the composition of the browser inspector 116 may be to prevent malicious actors from being able to successfully anticipate the type of browser identification tests that will be applied against a maliciously modified requesting web browser or requesting application. In this way, a malicious actor cannot circumvent or code the web browser in order to successfully pass the tests. The selected tests may be part of a predetermined testing set stored at the access control platform 110 or stored in a test library associated with the access control platform no. The tests may be periodically or continually updated to take into account newly vulnerabilities of a web page, new methods for identifying a web browser or page, new methods for identifying malicious techniques for illegitimately modifying a web browser, and the like.

At step S208, the browser inspector 116 applies the combination of the selected tests against the web browser, collects runtime environment data from the executed tests, and consequently, generates or compiles a runtime environment profile of the analyzed web browser to detect the browser's identity. In some embodiments, the browser inspector 116 may function to execute the combination of selected tests in parallel to expedite an identification of the web browser. The generated runtime environment data of the web browser generally includes one or more of JavaScript libraries and objects available to the web browser, any code or components of the web browser demonstrating anomalous behavior, DOM implementation peculiarities specific to the web browser, various attributes accessible to JavaScript that can be used to uniquely identify the type and version of the web browser, and possibly unknown or unidentifiable components or code within the web browser.

The runtime environment profile of the web browser generally acts as a fingerprint or may be converted into a digital fingerprint of the specific web browser that was analyzed. The fingerprint of the specific web browser may include specific data from the runtime environment profile that may be sufficient to clearly distinguish the specific browser from any other existing browser and further, identify a version and/or type of web browser. Thus, using the fingerprint of the web browser, the access control platform 110 may be able to at least classify the web browser even if the access control platform no may not be able to definitely identify a version number and/or browser type of the specific browser.

At step S210, the runtime environment profile and/or the fingerprint of the web browser may be directed back into or transmitted to the access control platform and further, analyzed by the access control platform no. It shall be noted that the browser inspector 116 may be generated and then configured to function on the client device or computing device of a user operating the web browser that makes the request for the web application. Additionally, or alternatively, the browser inspector 116 may be generated at the access control platform 110 and operates to inspect the web browser from the access control platform no. Accordingly, when the browser inspector 116 is executed remotely from the requesting web browser, the browser inspector 116 may function to transmit identity probes that function to collect browser identification data according to the combination of browser identification tests that define the browser inspector 116. When the browser inspector 116 is operated at the client device or computing device of a user, the generated runtime environment profile may be transmitted via a network or the like to the access control platform 110.

At step S212, a browser identifier identifies the web browser type and version based on the generated runtime profile data. The browser identifier 115 also generates a confidence score relating to the accuracy or validity of the identified web browser type and/or version of the web browser. Additionally, or alternatively, the browser identifier may generate a browser confidence score that indicates a likelihood or (e.g., low, medium, or high likelihood, etc.) or probability (e.g., 0%-100%) that the subject requesting web browser (or application) matches a web browser type and/or web browser version that is estimated or identified by the browser identifier. In some embodiments, the estimated web browser version and/or estimated web browser type output by the browser identifier may not match a claimed browser version and/or a claimed browser type. In such embodiments, whether a claimed browser version and/or a claimed browser type matches or does not match an estimated browser version and/or an estimated browser type may be used as a factor or a weight for determined a confidence score. In such cases, the confidence score may additionally relate to a determined or estimated level of legitimacy or a level of threat posed (e.g., a browser threat score) by the web browser attempting to access the web application and/or the web application server.

In a preferred embodiment, the browser identifier 115 may be an integral component of the access control platform 110 that receives the transmission of the generated runtime profile data from the browser inspector 116 operating at the client device or user computing device. Alternatively, the browser identifier and the browser inspector 116 may be implemented together either at the access control platform 110 or at the entity's platform via the client device or user computing device.

The confidence score or level generated by the browser identifier may be based on a combination of scoring from each of the tests applied against the web browser. The greater the level of definitiveness or certainty that a specific test provides regarding the identity of a web browser, the higher the confidence score that may be attributed to that test. The converse logic may be applied, regarding lower levels of certainty. The generated confidence score in this regard may be a sum or aggregate of all of the confidence scores for each of the tests applied to a web browser by the browser inspector. Additionally, or alternatively, certain tests may be weighted differently. For instance, a test relating to the validity of the user-agent string from a web browser may be weight greater than a test evaluating an HTTP header of a browser.

In a preferred embodiment, each of the one or more browser tests and/or the one or more browser assessments that are combined together to create a unique browser inspector for the web browser requesting access to an application server (e.g., a web application server) may function to perform an assessment or evaluation of the requesting web browser and contribute a (confidence or assessment) scoring value for determining the overall confidence score for the requesting web browser. That is, each of the browser tests and/or browser assessments forming the browser inspector may function as contributors to the overall confidence score that is generated by the browser identifier implemented at an access control platform or the like. For example, if a browser confidence score ranges from zero to one hundred (0-100) and a unique browser inspector is composed of four (4) unique browser identity tests (e.g., test 1, test 2, test 3, and test 4). Each of the 4 unique browser identity tests may function to evaluate different browser identifying data and/or browser attributes and generate a sub-confidence score between zero and twenty-five (0-25). Accordingly, when the browser inspector is executed at a requesting web browser, each of the 4 unique browser identity tests are executed and function to collect runtime environment data and/or browser identifier data. Based on the collected runtime environment data and/or browser identifier data, each of the 4 unique browser identity tests may function to generate a sub-confidence score between 0-25. For instance, an output from each of the 4 unique browser identity tests may be test 1: 23 sub-confidence score, test 2: 18 score, test 3: 25, and test 4: 15 score. Once each sub-confidence score is determined by each of the unique browser identity tests, the browser identifier operating at the access control platform may function to aggregate the four sub-confidence scores to an overall or global confidence score (e.g., 23+18+25+15=81).

It shall be understood that a sub-confidence score generated by a browser identity test may have any scoring range (e.g., 0-50, 0-100, A-D, low-high, etc.) and that each browser identity test of a combination of browser identity tests may have a different scoring range indicating that some browser identity tests in a combination of browser identity tests forming a browser inspector may be weighted more heavily than other companion tests forming the browser inspector. Additionally, or alternatively, the browser identifier may function to apply unique scoring weights and/or scoring coefficients to the resulting sub-confidence scores of the browser identity tests. In this way, a perceived importance or a probative importance of each browser identity test may be differentiated when calculating an overall confidence score. For instance, a first predetermined browser test weight or coefficient may be multiplied against a sub-confidence score produced by a first browser test and a second predetermined browser test weight or coefficient may be multiplied against a sub-confidence score produced by a second browser test. The results of after applying the weights may be added together to determine an over confidence score.

At step S214, responsive to the identified browser type and version, as well as the confidence score, the access control platform 110 may allow or deny access to the web application or associated application. Additionally, or alternatively, the access control platform 110 may function to specifically tailor access rights of the web browser based on the generated browser identity confidence score. In such embodiments, lower confidence scores may result in very restrictive access to a web application or web application server when compared to a less restrictive access allowed for higher confidence scores. In some embodiments, the access control platform 110 may have internal control thresholds set based on access control policy or the like to which the confidence score for a specific web browser may be compared. The internal control thresholds may vary for different types and/or versions of browsers. That is, the internal control thresholds may not necessarily be the same for all analyzed web browsers, applications, and the like, as some browsers or applications present greater risks than other browsers or application. When the risk presented by a specific browser type may be high, correspondingly, the internal control threshold will be high. The converse logic may also apply for low risk browsers and applications.

Additionally, or alternatively, once the access control platform 110 identifies a confidence score, the access control platform no may reference a policy server associated with the entity to determine whether or not to allow or deny access to the application or browser based on one or more of the browser type, version, and confidence score. Accordingly, the policy server of the entity may similarly have internal control thresholds that can be used in determining which applications or browsers to allow or deny access to. In some embodiments, an access control policy referenced from the policy server may include a binary access control policy that sets a single threshold. In such embodiments, if the browser identity confidence score satisfies the threshold, unrestricted access to the requested web application or web service may be granted to the requesting web browser. Additionally, or alternatively, the access control policy may define a spectrum or continuum having a plurality of confidence score thresholds and each confidence score threshold being associated with a differentiated level of access to the web application, etc. Accordingly, as the continuum increases, the confidence score requirements may increase, and the level of access to the web application may correspondingly increase. The converse logic may also be true.

An alternative embodiment preferably implements the above methods in a computer-readable medium storing computer-readable instructions. The instructions are preferably executed by computer-executable components preferably integrated with a challenge response server. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A system for controlling access to a web application server, the system comprising:
 a remote access control platform being implemented by one or more computing servers having non-transitory computer-readable medium storing computer instructions, that when executed by one or more computer processors perform one or more steps including:
  receiving, from a requesting web browser, an access request for accessing a web application of a web application computing server;

in response to receiving the access request:
  establishing a browser identification assessment session between the requesting web browser and the remote access control platform;
  generating a browser identification inspector based on browser identifying data supplied by the requesting web browser, wherein generating the browser identification inspector includes selecting a combination of browser identification tests from a browser identification test bank;
  transmitting the generated browser inspector to the requesting web browser for execution, wherein during an execution of the browser identification inspector at the requesting web browser, the browser identification inspector collects runtime environment data of the requesting web browser using the combination of browser identification tests and transmits the collected runtime environment data to the remote access control platform;
  using the collected runtime environment data of the requesting web browser as input into a browser identifier module that:
    (i) estimates a browser version and a browser type of the requesting web browser,
    (ii) determines a browser identification sub-confidence score for each of the combination of browser identification tests, and
    (iii) determines an overall browser identification confidence score based on aggregating the browser identification sub-confidence scores from the combination of browser identification tests; and
  granting or denying access to the web application based on (a) the estimated browser version and the browser type of the requesting web browser and (b) the overall browser identification confidence score.

2. The system of claim 1, wherein:
the overall browser identification confidence score indicates a likelihood or a probability that the estimated browser version and browser type for the requesting web browser, as determined by the remote access control platform, matches an actual browser version and actual browser type of the requesting web browser.

3. The system of claim 1, wherein:
in response to receiving the access request for the web application, the web application server generates a web page comprising computer-executable code that, when executed, redirects the requesting web browser to the remote access control platform.

4. The system of claim 1, wherein:
the combination of browser identification tests forming the browser identification inspector are selected based on a receipt of Hypertext Transfer Protocol data from the requesting web browser.

5. A method for controlling access to a protected web application server, the method comprising:
  receiving, from a requesting browser application, an access request for accessing the protected web application server by the requesting browser application;
  in response to the access request, returning a web page embedded with an access control code that, when executed by the requesting web browser, initiates a browser testing session between the requesting web browser and a remote access control server that operates to control access to the protected web application server;
  during the browser testing session, generating a browser identity inspector based on a selection of two or more predetermined browser identity tests from a plurality of predetermined browser identity tests and transmitting the browser identity inspector to the requesting web browser for execution;
  at the requesting web browser, executing the browser identity inspector to collect selective runtime environment data of the requesting web browser based on an execution of the selected two or more predetermined browser identity tests at the requesting web browser;
  compiling the collected selective runtime environment data into a browser digital fingerprint of the requesting web browser;
  using the browser digital fingerprint to:
    (i) identify a browser version and/or a browser type of the requesting web browser;
    (ii) determine a browser identification sub-confidence score for each of the combination of browser identification tests, and
    (iii) determine an overall browser identity confidence score based on aggregating the browser identification sub-confidence scores from the combination of browser identification tests, wherein the overall browser identity confidence score indicates a likelihood or a probability that the identified browser version and/or the browser type is accurate; and
  setting a level of access for the requesting web browser to the protected web application server based on (a) the identified browser version and/or the browser type and (b) the overall browser identity confidence score.

6. The method of claim 5, wherein initiating the browser testing session between the requesting web browser and the remote access control server includes:
  transmitting an access request comprising (a) an identity of the protected web application server and (b) an asserted browser identity, wherein the asserted browser identity includes browser identifying data provided by the requesting web browser.

7. The method of claim 6, wherein identifying the level of access for the requesting web browser to the protected web application server includes:
  accessing an access policy server comprising a plurality of access policies for a plurality of protected web application servers;
  identifying an access policy for the protected web application server; and
  setting the level of access by applying the identified access policy to the browser identity score.

8. The method of claim 7, wherein:
the access policy comprises a plurality of access thresholds set based on a plurality of different browser identity score values,
each of the plurality of different browser identity score values is associated with a differentiated level of access privilege to the protected web application server, and
the access control server sets the level of access for the requesting web browser based on the overall browser confidence score satisfying one or more of the plurality of access thresholds.

9. The method of claim 5, further comprising:
compiling by the browser identity inspector the collected runtime environment data into a unique browser fingerprint for the requesting browser, wherein transmitting the collected runtime environment data comprises transmitting the browser fingerprint to the access control server.

10. The method of claim 5, wherein:
a first browser identity test of the two or more browser identity tests operates to collect Hypertext Transfer Protocol (HTTP) data of the requesting web browser,
the collected selective runtime environment data comprises the HTTP data, and
a browser identification module at the remote access control server receives, as input, the HTTP data and determines one of the browser version and/or the browser type of the requesting web browser.

11. The method of claim 5, wherein:
a second browser identity test of the two or more browser identity tests operates to collect user-agent string data supplied by the requesting web browser,
the collected selective runtime environment data comprises the user-agent string data, and
a browser identification module at the remote access control server receives, as input, the user-agent string data and determines one of the browser version and/or the browser type of the requesting web browser.

12. The method of claim 5, wherein:
a third browser identity test of the two or more browser identity tests operates to collect data relating to scripting language libraries and objects available to the requesting web browser,
the collected selective runtime environment data comprises the data relating to scripting language libraries and objects available to the requesting web browser, and
a browser identification module at the remote access control server receives, as input, the data relating to scripting language libraries and objects available to the requesting web browser and determines one of the browser version and/or the browser type of the requesting web browser.

13. The method of claim 5, wherein:
a fourth browser identity test of the two or more browser identity tests operates to collect data relating to Document Object Model implementation peculiarities specific to a browser,
the collected selective runtime environment data comprises the data relating to Document Object Model implementation peculiarities specific to a browser, and
a browser identification module at the remote access control server receives, as input, the data relating to Document Object Model implementation peculiarities specific to a browser and determines one of the browser version and/or the browser type of the requesting web browser.

14. The method of claim 5, wherein:
the selection of two or more predetermined browser identity tests from a plurality of predetermined browser identity tests is performed randomly by the access control platform.

15. The method of claim 5, wherein:
the protected web application server, in response to the access request, generates the web page embedded with the access control code and transmits the web page to the requesting browser.

16. The method of claim 5, wherein:
the access control server operates to generate the browser inspector in response to Hypertext Protocol Transfer data returned from the requesting browser.

17. The method of claim 5, wherein:
the access control code embedded within the web page returned to the requesting web browser includes a first computer-executable code that, when executed, causes the requesting web browser to establish an ephemeral channel of communication with the remote access control server.

18. The method of claim 5, wherein:
the selected two or more predetermined browser identity tests forming the browser identity inspector are executed in parallel at the requesting web browser.

19. A method for controlling access to a web application server, the method comprising:
receiving, from a requesting web browser, an access request for accessing a web application of a web application computing server;
in response to receiving the access request:
establishing a browser identification assessment session between the requesting web browser and a remote access control platform;
generating a browser identification inspector based on browser identifying data supplied by the requesting web browser, wherein generating the browser identification inspector includes selecting a combination of browser identification tests from browser identification test bank;
transmitting the generated browser inspector to the requesting web browser for execution, wherein during an execution of the browser identification inspector at the requesting web browser, the browser identification inspector collects runtime environment data of the requesting web browser using the combination of browser identification tests and transmits the collected runtime environment data to the remote access control platform;
using the collecting runtime environment data of the requesting web browser as input into a browser identifier module that:
(i) estimates a browser version and a browser type of the requesting web browser,
(ii) determines a browser identification sub-confidence score for each of the combination of browser identification tests, and
(iii) determines an overall browser identification confidence score based on aggregating the browser identification sub-confidence scores from the combination of browser identification tests; and
granting or denying access to the web application based on (a) the estimated browser version and the browser type of the requesting web browser and (b) the overall browser identification confidence score.

20. The method of claim 19, wherein:
the overall browser identification confidence score indicates a likelihood or a probability that the estimated browser version and browser type for the requesting web browser, as determined by the remote access control platform, matches an actual browser version and actual browser type of the requesting web browser.

* * * * *